(No Model.)
H. MUELLER.
BASIN CLAMP.
No. 515,836. Patented Mar. 6, 1894.
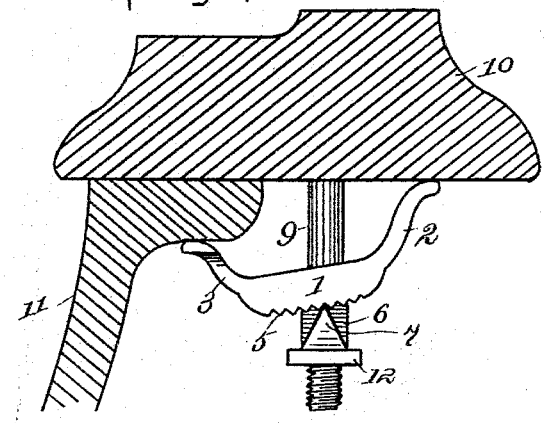
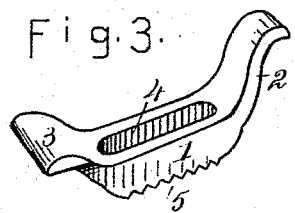
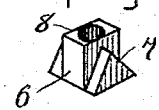
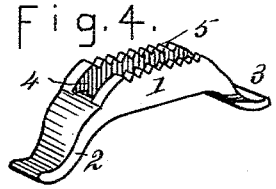
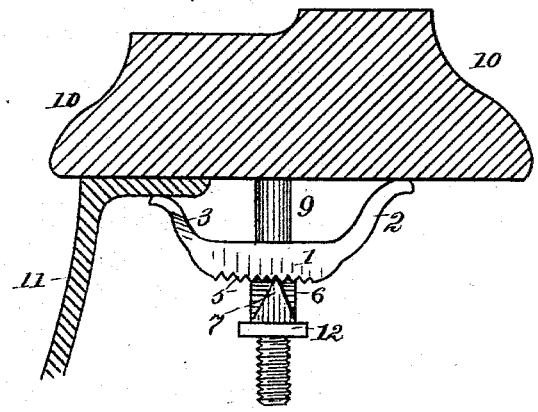
ATTEST
Helen Graham
William Graham
INVENTOR.
H. Mueller.
by his attorney
L. P. Graham
THE NATIONAL LITHOGRAPHING COMPANY,
WASHINGTON, D. C.

United States Patent Office.

HIERONYMUS MUELLER, OF DECATUR, ILLINOIS.

BASIN-CLAMP.

SPECIFICATION forming part of Letters Patent No. 515,836, dated March 6, 1894.

Application filed September 2, 1893. Serial No. 484,665. (No model.)

*To all whom it may concern:*

Be it known that I, HIERONYMUS MUELLER, of Decatur, in the county of Macon and State of Illinois, have invented certain new and useful Improvements in Basin-Clamps, of which the following is a specification.

This invention is designed to provide a clamp that will operate on basins having either thick or thin flanges, that will be secured against horizontal motion when clamped onto the basin, that will permit considerable latitude in the placing of the clamping bolt, and that will offer uniform resistance to all sides of the nut of the clamping bolt.

In the drawings forming part of this specification Figures 1 and 2 are side elevations of the clamp in connection with a section of basin and stand top, the first named figure showing a thick flange on the basin, and the last named figure showing a thin flange. Fig. 3 is a perspective representation showing the upper surface of the clamp bridge. Fig. 4 is a similar representation showing the lower surface of the bridge. Fig. 5 is a perspective representation of the clamp washer.

The clamp bridge comprises a body as 1 having upwardly deflected extensions, or feet, as 2 and 3, such body being slotted vertically as seen at 4 and corrugated along its under surface as seen at 5. The clamp bolt 9 is secured to the stand top 10 in the customary manner, and it extends through the slot of the bridge. The washer 6 has a hole 8 through which the clamping bolt extends, and it has on opposite sides bearing surfaces as 7 in line with the axis or longitudinal center of the bolt and adapted to engage the corrugations of the bridge. The nut 12 is adapted to be screwed onto the bolt, and, when so screwed, to hold the washer in close contact with the bridge, and the bridge in close contact with the stand top 10 and the flange of basin 11, as shown.

In clamping the basin the bolt is secured in the stand top adjacent to the flange of the basin, strict uniformity of distance not being needed, the bridge is placed on the bolt with foot 2 bearing against the stand top and foot 3 bearing against the flange of the basin; the washer is placed on the bolt with its bearings engaging corrugations of the bridge, and the bolt nut 12 is tightened against the washer.

The applicability of the clamp to flanges of different thicknesses is apparent from the drawings, as is also the possibility of longitudinal adjustment to accommodate varying distances between the bolt and the flange of the basin. In addition to this it will be understood that the washer will lock the bridge against longitudinal motion by pressing between two prominent members of a corrugation, and that, as the bearings of the washer are always in line with the longitudinal center of the bolt, the resistance against the clamping nut will always be uniformly distributed around the entire surface of the nut.

Having thus described my invention, I claim as new and desire to secure by Letters Patent—

1. A basin clamp comprising a clamp bolt, a bridge slotted to receive the bolt and having its under surface corrugated, a washer having bearings adapted to engage the corrugations of the bridge, and a nut for the bolt adapted to bear on the washer substantially as set forth.

2. A basin clamp comprising a clamp bolt, a bridge slotted to receive the bolt and having its under surface corrugated, a washer having bearings adapted to engage the corrugations of the bridge, such bearings being in line with the longitudinal center of the bolt, and a nut for the bolt, substantially as set forth.

In testimony whereof I sign my name in the presence of two subscribing witnesses.

HIERONYMUS MUELLER.

Attest:
W. H. ELWOOD,
H. E. KIZER.